(12) United States Patent
Wang et al.

(10) Patent No.: US 12,447,460 B2
(45) Date of Patent: Oct. 21, 2025

(54) TWO-DIMENSIONAL CHALCOGENIDE, AND PREPARATION METHOD AND USE THEREOF

(71) Applicant: SOOCHOW UNIVERSITY, Suzhou (CN)

(72) Inventors: Shuao Wang, Suzhou (CN); Yugang Zhang, Suzhou (CN); Linwei He, Suzhou (CN); Long Chen, Suzhou (CN); Lanhua Chen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 485 days.

(21) Appl. No.: 18/172,244

(22) Filed: Feb. 21, 2023

(65) Prior Publication Data

US 2023/0201797 A1 Jun. 29, 2023

Related U.S. Application Data

(63) Continuation-in-part of application No. PCT/CN2021/041923, filed on Dec. 28, 2021.

(30) Foreign Application Priority Data

Oct. 27, 2021 (CN) .......................... 202111257968.9

(51) Int. Cl.
*B01J 20/22* (2006.01)
*B01J 20/30* (2006.01)
(Continued)

(52) U.S. Cl.
CPC ......... *B01J 20/223* (2013.01); *B01J 20/3085* (2013.01); *C07F 7/226* (2013.01); *G21F 9/02* (2013.01); *C07B 2200/13* (2013.01)

(58) Field of Classification Search
CPC .. B01J 20/223; B01J 20/3085; B01J 20/3078; C07F 7/226; G21F 9/02; C07B 2200/13
See application file for complete search history.

(56) References Cited

U.S. PATENT DOCUMENTS

2018/0162732 A1* 6/2018 Li ........................... C01G 1/12
2020/0198983 A1 6/2020 Ritchie et al.

FOREIGN PATENT DOCUMENTS

| CN | 104399538 A | 3/2015 |
|---|---|---|
| CN | 105754584 A | 7/2016 |
| CN | 113351186 A | 9/2021 |

OTHER PUBLICATIONS

Pienack, et al., New Thiostannates Synthesized Under Solvothermal Conditions: Crystal Structures of (trenH)2Sn3S7 and {[Mn(tren)]2Sn2S6, 2012, (Year: 2012).*
(Continued)

*Primary Examiner* — Daniel C. Mccracken
*Assistant Examiner* — Starfari Teshawn Mcclain
(74) *Attorney, Agent, or Firm* — SZDC Law PC

(57) ABSTRACT

The invention provides a two-dimensional chalcogenide, which is a crystalline material, and has a chemical formula of $(NH_4)_2[Sn_3S_7] \cdot (C_4H_{13}N_3)_{1.41}$, cell parameters of $a=b=13.2307(10)$ Å, $c=19.335(2)$ Å, $\alpha=\beta=90°$, and $\gamma=120°$, and space group of $P6_3/mmc$. The invention further provides a method for preparing the two-dimensional chalcogenide and use thereof in the adsorption of iodine vapor. The two-dimensional chalcogenide of the present invention is capable of removing iodine vapor of various concentrations (as low as 400 ppm) over a wide range of temperatures (25° C.-75° C.), without desorption of iodine after standing for a long time.

10 Claims, 3 Drawing Sheets

(51) Int. Cl.
*C07F 7/22* (2006.01)
*G21F 9/02* (2006.01)

(56) References Cited

OTHER PUBLICATIONS

Subrahmanyam, et al., Chalcogenide Aerogels as Sorbents for Radioactive Iodine, Chemistry of Materials, 2015 ; 2619-2625 (Year: 2015).*
Kin Wang et al., "A 2D Layered Thiostannate: Synthesis and Crystal Structure of [tmdpH2]Sn3S7" Chinese J. Struct. Chem. vol. 29, No. 2, pp. 260-264 (Feb. 15, 2010).

* cited by examiner

TWO-DIMENSIONAL CHALCOGENIDE, AND PREPARATION METHOD AND USE THEREOF

The present application is a Continuation-in-part Application of PCT/CN2021/141923, filed on Dec. 28, 2021, which claims priority to Chinese Patent Application No. CN 202111257968.9, filed on Oct. 27, 2021, which is incorporated by reference for all purposes as if fully set forth herein.

FIELD OF THE INVENTION

The present invention relates to the technical field of adsorption materials, and particularly to a two-dimensional chalcogenide, and a preparation method and use thereof.

DESCRIPTION OF THE RELATED ART

Nuclear energy is one of the most promising clean energy sources in the future. With the continuous development of nuclear power, the reserves of spent nuclear fuel grow increasingly. Spent nuclear fuel contains unfissioned uranium-235, which is required to be recycled and reused. During the post-treatment of spent nuclear fuel, a large amount of gaseous radioactive iodine is produced. Compared with solid radioactive waste, due to the high fluidity, the tendency to migrate with the airflow, and other characteristics, the gaseous radioactive iodine results in a larger contaminated area, having great potential to cause serious harm to the ecological environment and human health. Studies of the nuclear accidents at the Chernobyl and Fukushima nuclear power plants show that radioactive iodine is a fast-spreading, highly hazardous radionuclide. Therefore, the adsorption and treatment of gaseous iodine in waste gas from post-treatment plants have become an important research direction for radioactive waste gas treatment. At present, gaseous radioactive iodine is mainly removed by dry dust removal, liquid absorption and solid-phase adsorption. Dry dust removal has low efficiency in the treatment of radioactive gas, and is often used in the disposal of radioactive aerosols. Liquid absorption mainly includes mercury washing, acid washing and alkaline washing. Although this method has a high absorption rate, a large amount of toxic mercury nitrate or nitric acid and strong acid and base such as sodium hydroxide is used, the operation and maintenance costs of the equipment are high, and a large amount of radioactive waste liquid is produced. Solid-phase adsorption is one of the most important iodine removal methods, in which silver-containing zeolite is most commonly used. Although silver-based zeolite has a high removal rate for iodine, the large use of silver leads to the high cost of the adsorbent material, and brings some environmental pollution problems.

At present, the solid-phase adsorption method for capturing radioactive iodine in industry mainly relies on the use of active silver (Ag) supported on various solid supports as an adsorbent. Active silver (silver nanoparticles/silver nanoclusters/silver ions) can convert radioactive iodine into solid AgI, to remove the iodine. The biggest limitation of this adsorbent in practical applications is the instability of the Ag—I bond (the bond energy between Ag—I is typically 66 kJ/mol). When the iodine-loaded silver-based adsorbent is further treated, the unstable Ag—I bond is broken when exposed to ambient conditions such as light and temperature, causing the re-release of radioactive iodine, and thus radioactive contamination.

Moreover, the traditional method for treating and capturing iodine compounds in industry is to impregnate activated carbon with an organic amine, such as triethylenediamine. Triethylenediamine is the most common impregnant used to capture radioactive iodine species in activated carbon adsorbents. Compared with other adsorbents, triethylenediamine-impregnated activated carbon has excellent adsorption capacity and high purification efficiency, and the process of capturing iodine is relatively simple. However, the shortcomings are also obvious: (1) The adsorption capacity decreases with the increase of temperature; (2) the sublimation of organic amines easily occurs, leading to a significant decrease in the iodine absorption efficiency of the impregnated carbon material; and iodine adsorption is an exothermic process, and the organic amines lowers the ignition point of the impregnated carbon, exacerbating the safety hazards.

Metal-organic frameworks and covalent organic frameworks are a new class of crystalline porous materials. Due to the diversity of the metal centers and the ligands, these materials have variable chemical properties, and find wide use in the removal of radioactive iodine. However, the high cost of organic ligands limits their practical use.

SUMMARY OF THE INVENTION

To solve the above technical problems, a new two-dimensional layered sulfide material is synthesized in the present invention, with which iodine vapor can be removed with high efficiency.

The present invention provides the following technical solutions.

The present invention provides a two-dimensional chalcogenide, which is a crystalline material, and has a chemical formula of $(NH_4)_2[Sn_3S_7]\cdot(C_4H_{13}N_3)_{1.41}$, cell parameters of $a=b=13.2307(10)$ Å, $c=19.335(2)$ Å, $\alpha=\beta=90°$, $\gamma=120°$, and space group of $P6_3/mmc$.

The present invention further provides a method for preparing the two-dimensional chalcogenide, which comprises the following steps: reacting a tin source and elemental sulfur in diethylenetriamine at 150° C. to 180° C., to obtain the two-dimensional chalcogenide, where the molar ratio of the tin source to the elemental sulfur is 1:1 to 1:5.

Preferably, since this reaction needs to be carried out with heating and the reaction time is long, the reaction is preferably carried out in a closed vessel to avoid the large volatilization of diethylenetriamine.

In the present invention, diethylenetriamine functions as a solvent and template in the reaction, and the ammonium ions formed after the completion of the reaction are present in the pores of the two-dimensional chalcogenide, to balance the charge between layers. The amount of diethylenetriamine added is appropriate to immerse the reactant, and generally ⅕~⅗ of the volume of the reaction vessel.

Preferably, the tin source is elemental tin or a tetravalent tin salt. The elemental tin includes, but is not limited to, tin powder, tin particles, tin rods, or preferably tin powder. The tetravalent tin salt is preferably tin tetrachloride.

Preferably, the elemental sulfur is preferably sublimed sulfur.

Preferably, the reaction time is 3 to 7 days.

Preferably, the molar ratio of the tin source to the elemental sulfur is 3:7.

The present invention further provides the use of the two-dimensional chalcogenide in the adsorption of iodine vapor.

For the two-dimensional chalcogenide $(NH_4)_2[Sn_3S_7]\cdot(C_4H_{13}N_3)_{1.41}$ according to the present invention, $S^{2-}$ in the molecular structure can reduce gaseous $I_2$ into $I^-$, and then $Sn^{4+}$ reacts with $I^-$ to produce $SnI_4$, to realize the adsorption for iodine vapor. Further, the produced $SnI_4$ is stable, and no desorption of iodine occurs due to long-time standing.

Preferably, the iodine vapor is radioactive iodine vapor.

Preferably, the two-dimensional chalcogenide has an adsorption capacity of up to 1.66 g/g for iodine vapor with a concentration of 400 ppm at 25° C., and an adsorption capacity of up to 2.12 g/g for iodine vapor with a concentration of 400 ppm at 75° C.

Compared with the related art, the present invention has the following beneficial effects.

1. In view of the high cost and limited adsorption capacity of the traditional silver-based zeolite material for radioactive iodine in tail gas from the treatment of spent nuclear fuel, a new two-dimensional chalcogenide $(NH_4)_2[Sn_3S_7]\cdot(C_4H_{13}N_3)_{1.41}$ is synthesized in the present invention. $S^{2-}$ in the two-dimensional chalcogenide reduces $I_2$ into $I^-$, and then $Sn^{4+}$ reacts with $I^-$ to produce $SnI_4$, to realize the adsorption for radioactive iodine vapor.

2. The two-dimensional chalcogenide according to the present invention is capable of removing iodine vapor of various concentrations (as low as 400 ppm) over a wide range of temperatures (25° C.-75° C.), without desorption of iodine after standing for a long time.

3. The two-dimensional chalcogenide of the present invention has a low cost. It is estimated that the cost of materials adsorbing 1 g of iodine vapor is only CNY 0.4. Therefore, the two-dimensional chalcogenide of the present invention has the potential for industrial application.

DETAILED DESCRIPTION OF THE PREFERRED EMBODIMENTS

The present invention will be further described below with reference to the accompanying drawings and specific examples, so that those skilled in the art can better understand and implement the present invention; however, the present invention is not limited thereto.

Unless otherwise stated, all technical and scientific terms used herein have the same meaning as commonly understood by persons skilled in the art to which the present invention pertains. The terms used in the descriptions of the present invention are for the purpose of describing specific embodiments only and are not intended to limit the present invention. The term "and/or" as used herein includes any and all combinations of one or more of the listed related items.

Unless otherwise stated, the experimental methods given in examples below are all conventional methods. The materials and reagents involved in the examples are commercially available, unless otherwise specified.

Example 1

Synthesis of Two-Dimensional Chalcogenide $(NH_4)_2[Sn_3S_7]\cdot(C_4H_{13}N_3)_{1.41}$ 3 mmol of tin powder and 7 mmol of sulfur powder were added to the reaction vessel, and then 4 mL of diethylenetriamine was added. The reaction vessel was sealed, and the reaction temperature was set to 180° C. The reaction was continued for 4 days, followed by programmed cooling for 12 hrs to room temperature. After the reaction, the product was washed with water to obtain a yellow crystal designated as SCU-SnS.

The obtained yellow crystal was tested by single-crystal X-ray diffraction. The crystallographic parameters are listed in Table 1.

TABLE 1

Crystallographic parameters of two-dimensional chalcogenide $(NH_4)_2[Sn_3S_7]\cdot(C_4H_{13}N_3)_{1.41}$

| | |
|---|---|
| Materials | SCU—SnS |
| Molecular formula | $(NH_4)_2[Sn_3S_7]\cdot(C_4H_{13}N_3)_{1.41}$ |
| Mr [g · mol$^{-1}$] | 762.08 |
| Crystal system | Hexagonal system |
| Space group | P6$_3$/mmc |
| a (Å) | 13.2307(10) |
| b (Å) | 13.2307(10) |
| c (Å) | 19.335(2) |
| α | 90 |
| β | 90 |
| γ | 120 |
| V (Å$^3$) | 2931.2(5) |
| Z | 1 |
| D$_c$ (g cm$^{-3}$) | 1.420 |
| μ (mm$^{-1}$) | 3.016 |
| F (000) | 1176 |
| T(K) | 173(2) |
| GOF on F$^2$ | 1.102 |
| R$_1$,$^a$ wR$_2$$^b$ (I > 2σ(I)) | 0.0344, 0.0462 |
| R$_1$,$^a$ wR$_2$$^b$ (all data) | 0.0876, 0.0917 |

$^a$R$_1$ = Σ||F$_o$| − |F$_c$||/Σ|F$_o$|.
$^b$wR$_2$ = [Σw(F$_o$$^2$ − F$_c$$^2$)$^2$/Σw(F$_o$$^2$)$^2$]$^{1/2}$

Figure 1:
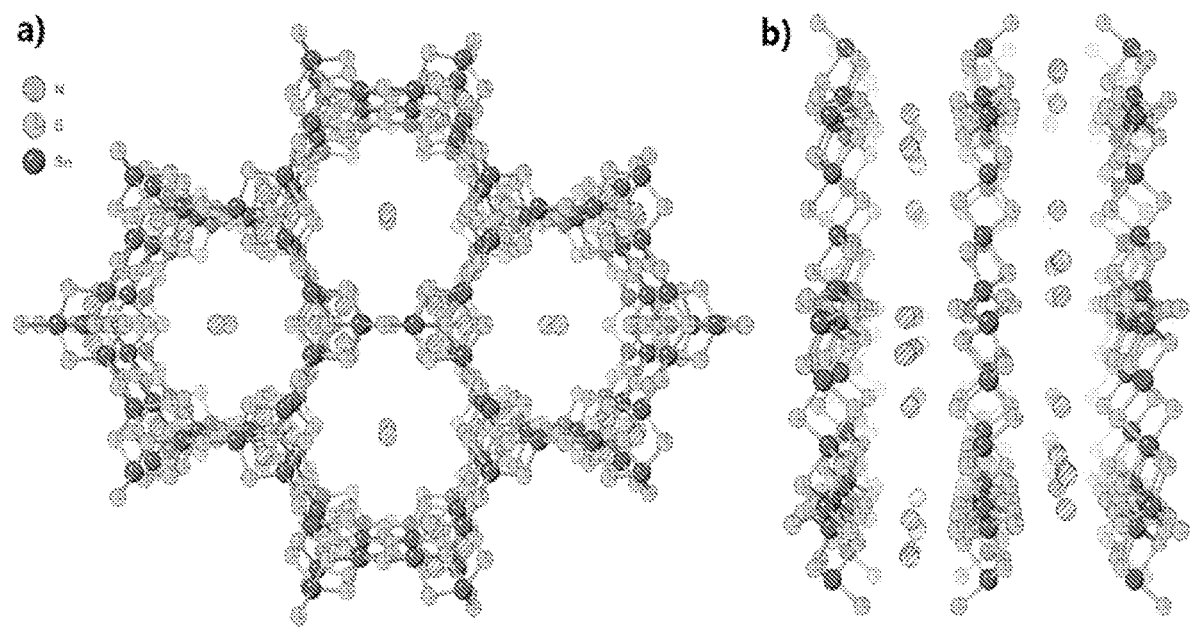
FIG. 1 is a schematic view of $(NH_4)_2[Sn_3S_7]\cdot(C_4H_{13}N_3)_{1.41}$.
Figure 2:
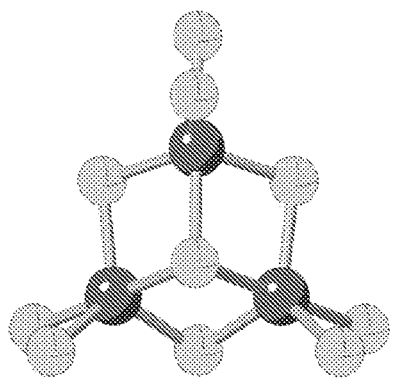
FIG. 2 shows a triangular node composed of a Sn atom and a S atom in the structure of $(NH_4)_2[Sn_3S_7]\cdot(C_4H_{13}N_3)_{1.41}$.

FIGS. 1 and 2 schematically show the structure of the two-dimensional chalcogenide. As can be seen, the Sn atom and S atom form a triangle-like node, and the nodes are connected to each other through S atoms to form a layered structure. The layers are stacked with each other to form a negatively charged frame structure, and ammonium ions are present in the pores of $(NH_4)_2[Sn_3S_7]\cdot(C_4H_{13}N_3)_{1.41}$, to balance the charges.

The obtained two-dimensional chalcogenide was tested by thermogravimetric analysis (TG) under a nitrogen atmosphere, at a temperature ramping from 30° C. to 900° C. at a heating rate of 10° C./min. The results are shown in FIG. 3.

Figure 3:
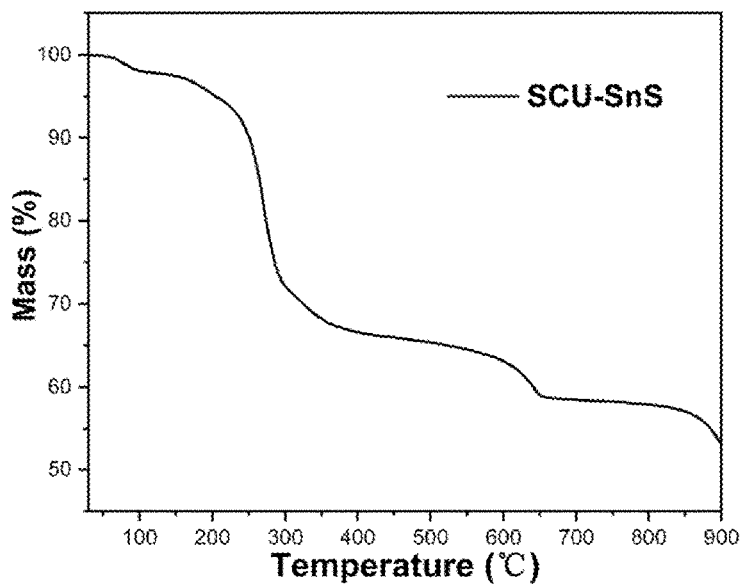
FIG. 3 shows a curve of thermogravimetric analysis of $(NH_4)_2[Sn_3S_7]\cdot(C_4H_{13}N_3)_{1.41}$.

It can be seen from FIG. 3 that under a nitrogen atmosphere, the two-dimensional chalcogenide is stable at 200° C., indicating that the material has good thermal stability. The weight reduction between 30° C. and 100° C. is mainly caused by the volatilization of water molecules on the surface of SCU-SnS, and the structure is disintegrated at around 200° C.

Example 2

At 75° C., the two-dimensional chalcogenide material was placed in an atmosphere with a high concentration of iodine vapor (16000 ppm), and the adsorption amount of the material for iodine vapor was tested periodically. The result obtained is shown in FIG. 4(a).

Figure 4A:
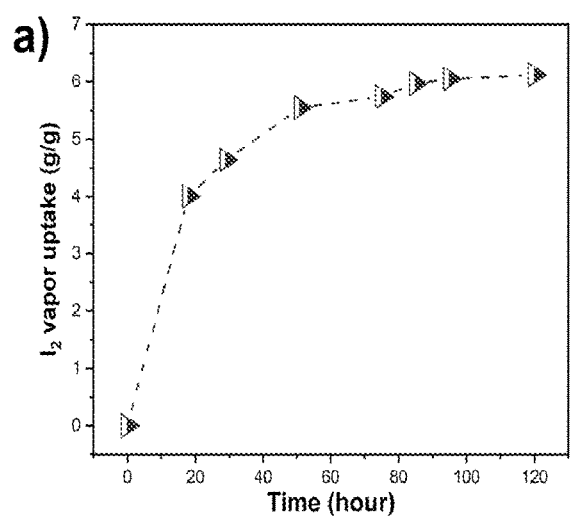
FIG. 4(a) shows the adsorption amount of $(NH_4)_2[Sn_3S_7]\cdot(C_4H_{13}N_3)_{1.41}$ for a high concentration of iodine vapor at 75° C. as a function of time.

It can be seen from FIG. 4(a) that as the reaction time elapses, the amount of iodine adsorbed on the material initially increases rapidly, then gradually becomes stable, and finally reaches equilibrium. The adsorption capacity is as high as 6.12 g/g. The two-dimensional chalcogenide material is an inorganic material with the highest adsorption capacity reported so far.

Example 3

The iodine-adsorbed two-dimensional chalcogenide material was left to stand, and the amount of iodine adsorbed on the material was tested periodically. The result is shown in FIG. 4(b).

Figure 4B:
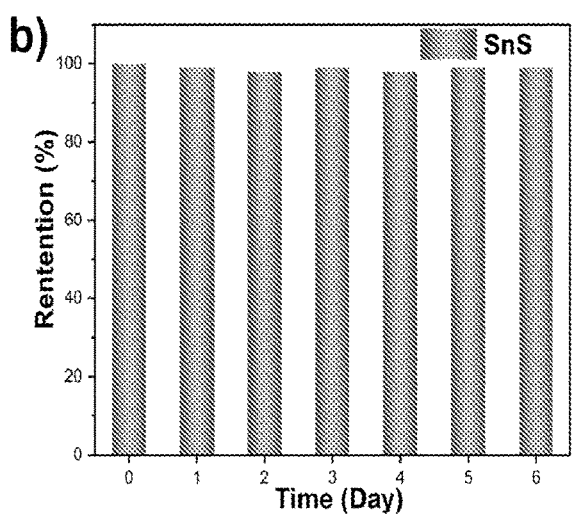
FIG. 4(b) shows the change in the amount of iodine adsorbed on $(NH_4)_2[Sn_3S_7]\cdot(C_4H_{13}N_3)_{1.41}$ after long-time standing.

It can be seen from FIG. 4(b) that after the iodine-adsorbed two-dimensional chalcogenide material is left to stand for 6 days, the retention rate of iodine on the material is still close to 100%. This indicates that the two-dimensional chalcogenide material has no desorption of iodine due to long-term standing, and thus has good adsorption stability.

Example 4

Figure 5:
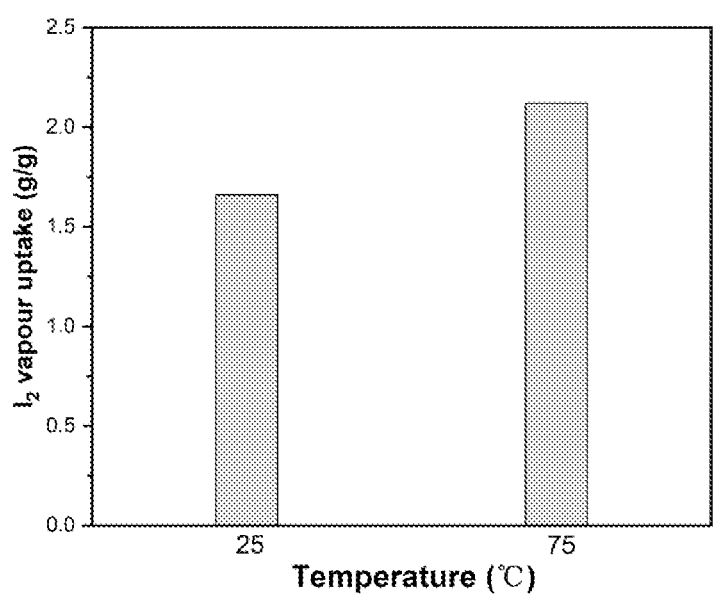
FIG. 5 shows the equilibrium adsorption capacity of $(NH_4)_2[Sn_3S_7]\cdot(C_4H_{13}N_3)_{1.41}$ for a low concentration of iodine vapor at 25° C. and 75° C.

The two-dimensional chalcogenide material was allowed to stand in an atmosphere with iodine vapor of 400 ppm (close to the concentration of iodine vapor in the post-treatment process of spent nuclear fuel), at 25° C. and 75° C. respectively. The equilibrium adsorption capacity of the material for iodine vapor was tested. The result is shown in FIG. 5.

The result shows that the material has an adsorption capacity of up to 1.66 g/g for iodine vapor with a concentration of 400 ppm at 25° C., and an adsorption capacity of up to 2.12 g/g for iodine vapor with a concentration of 400 ppm at 75° C. (close to the temperature of the tail gas at the tail end of the device for post-treatment of the spent nuclear fuel).

Therefore, the new two-dimensional chalcogenide $(NH_4)_2[Sn_3S_7] \cdot (C_4H_{13}N_3)_{1.41}$ provided in the present invention has a good absorption effect for iodine vapor, and has no desorption of iodine after standing for a long time, thus being applicable to the removal of radioactive iodine vapor during the post-treatment of spent nuclear fuel.

The above-described embodiments are merely preferred embodiments for the purpose of fully illustrating the present invention, and the scope of the present invention is not limited thereto. Equivalent substitutions or modifications can be made by those skilled in the art based on the present invention, which are within the scope of the present invention as defined by the claims. The scope of the present invention is defined by the appended claims.

What is claimed is:

1. A two-dimensional chalcogenide, which is a crystalline material, and has a chemical formula of $(NH_4)_2[Sn_3S_7] \cdot (C_4H_{13}N_3)_{1.41}$, cell parameters of a=b=13.2307(10) Å, c=19.335(2) Å, $\alpha=\beta=90°$, and $\gamma=120°$, and space group of $P6_3/mmc$.

2. A method for preparing a two-dimensional chalcogenide according to claim 1, comprising: reacting a tin source and elemental sulfur in diethylenetriamine at 150° C. to 180° C., to obtain the two-dimensional chalcogenide, wherein a molar ratio of the tin source to the elemental sulfur is 1:1 to 1:5.

3. The method for preparing a two-dimensional chalcogenide according to claim 2, wherein the reaction is carried out in a sealed environment.

4. The method for preparing a two-dimensional chalcogenide according to claim 2, wherein the tin source is a tin powder or tin tetrachloride.

5. The method for preparing a two-dimensional chalcogenide according to claim 2, wherein the elemental sulfur is sublimed sulfur.

6. The method for preparing a two-dimensional chalcogenide according to claim 2, wherein the molar ratio of the tin source to the elemental sulfur is 3:7.

7. The method for preparing a two-dimensional chalcogenide according to claim 2, wherein the reaction time is 3 to 7 days.

8. A method comprising adsorbing iodine vapor with the two-dimensional chalcogenide according to claim 1 in adsorption of iodine vapor.

9. The method of claim 8, wherein the iodine vapor is radioactive iodine vapor.

10. The method of claim 8, wherein the two-dimensional chalcogenide has an adsorption capacity of up to 1.66 g/g for iodine vapor with a concentration of 400 ppm at 25° C., and an adsorption capacity of up to 2.12 g/g for iodine vapor with a concentration of 400 ppm at 75° C.

* * * * *